United States Patent [19]

Northey et al.

[11] 3,953,999

[45] May 4, 1976

[54] METHOD AND APPARATUS FOR FORMING A SAW CHAIN CUTTER LINK

[75] Inventors: Douglas A. Northey; Stanton W. Weber, both of Peterborough, Canada

[73] Assignee: Outboard Marine Corporation, Waukegan, Ill.

[22] Filed: May 6, 1974

[21] Appl. No.: 467,224

[52] U.S. Cl. ................................ 72/381; 72/403; 76/112
[51] Int. Cl.² ...................... B21D 5/01; B21D 22/00
[58] Field of Search ............. 72/306, 381, 403, 382, 72/384; 76/112

[56] References Cited
UNITED STATES PATENTS

| | | | |
|---|---|---|---|
| 482,962 | 9/1892 | Gordon et al. | 72/306 |
| 3,062,262 | 11/1962 | Post | 72/403 |
| 3,731,514 | 5/1973 | Deibele, Jr. | 72/306 |
| 3,802,246 | 4/1974 | Goff | 72/381 |
| 3,837,241 | 9/1974 | Weiss | 76/112 |

FOREIGN PATENTS OR APPLICATIONS

| | | | |
|---|---|---|---|
| 674,530 | 11/1963 | Canada | 72/306 |

*Primary Examiner*—Milton S. Mehr
*Attorney, Agent, or Firm*—Michael, Best & Friedrich

[57] ABSTRACT

Disclosed herein is a method and apparatus for forming a saw chain cutting link blank including a link portion, a shank portion extending from the link portion, and a toe portion extending from the shank portion, into a saw chain cutting link wherein the shank portion extends from the link portion in angular relation thereto and wherein the toe portion extends from the shank portion in angular relation thereto and in transverse relation to the link portion, the apparatus comprises means for locating a blank relative to a stationary die part, means including a first die part movable in a rectilinear path relative to the stationary die part for bending the shank portion relative to the link portion into the angular relation in response to movement of the first movable die part relative to the stationary die part, means including a second die part movable in the direction of the rectilinear path and relative to the stationary die part for partially bending the toe portion relative to the shank portion in response to movement of the second die part relative to the stationary die part, and means including a third die part movable in a direction transverse to the rectilinear path and relative to the stationary die part for completing bending of the toe portion into the angular relation to the shank portion and into transverse relation to the link portion in response to movement of the third die part relative to the stationary die part.

11 Claims, 10 Drawing Figures

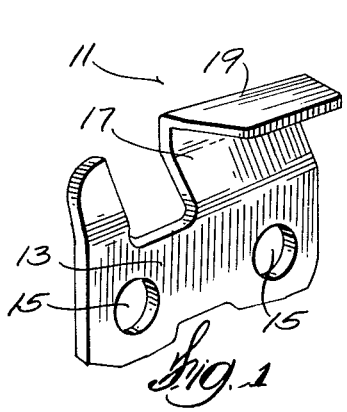
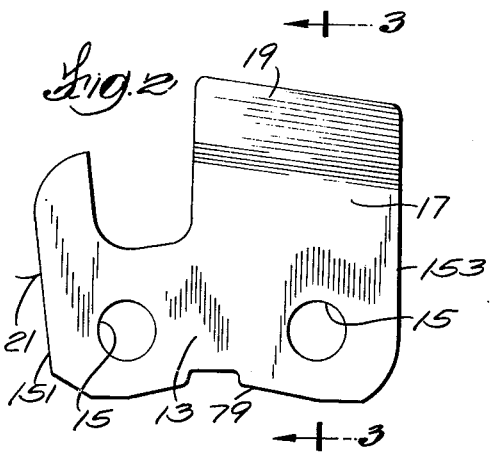
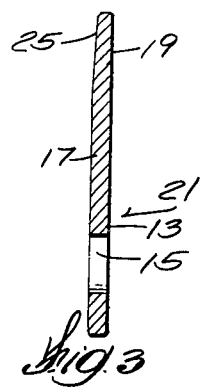
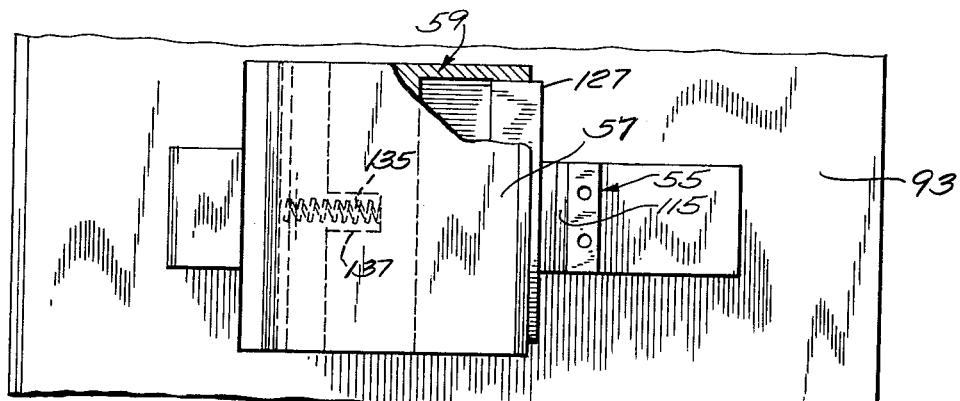
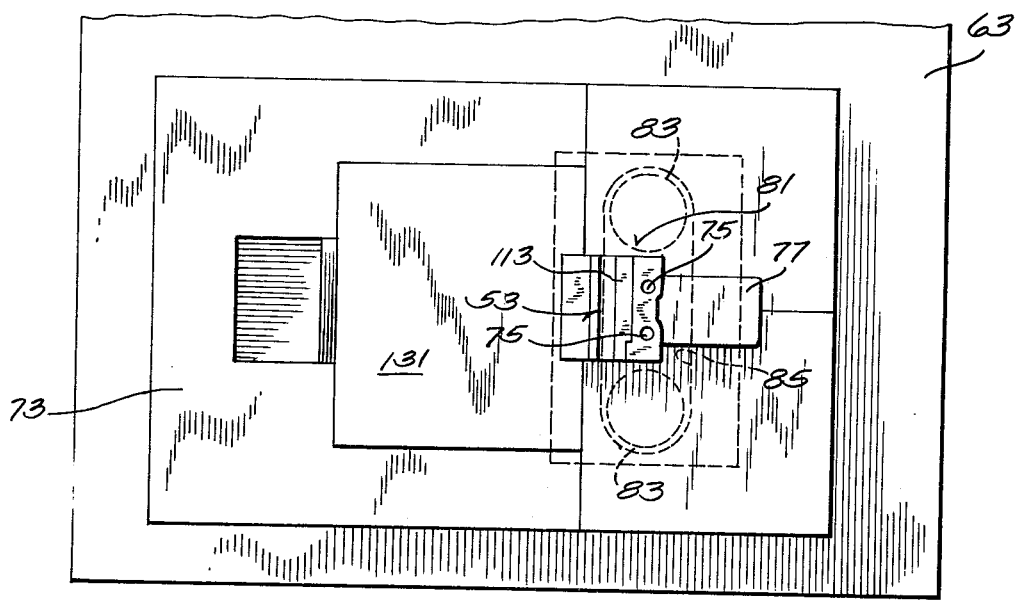

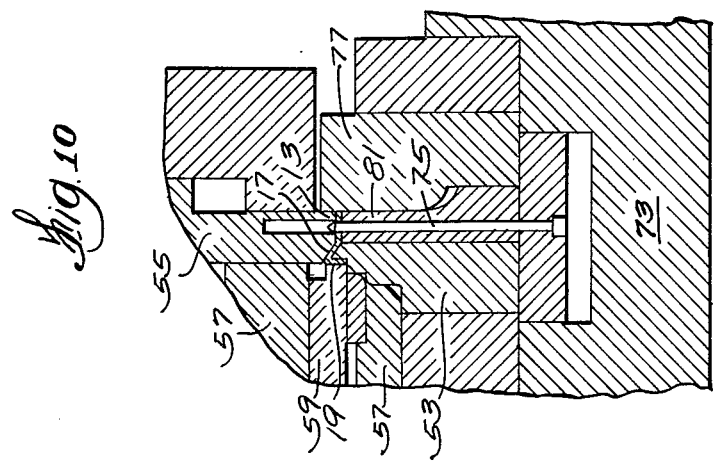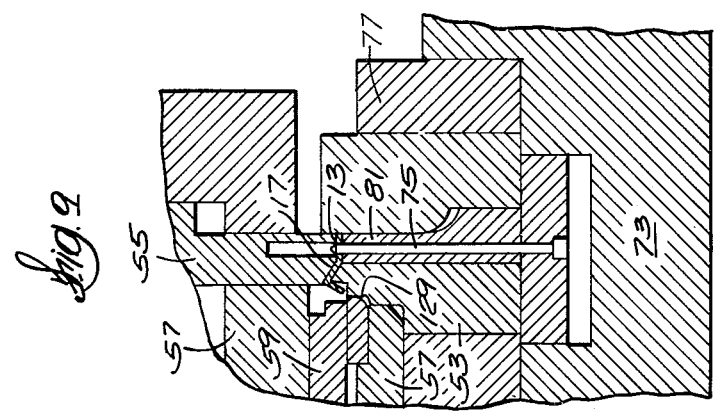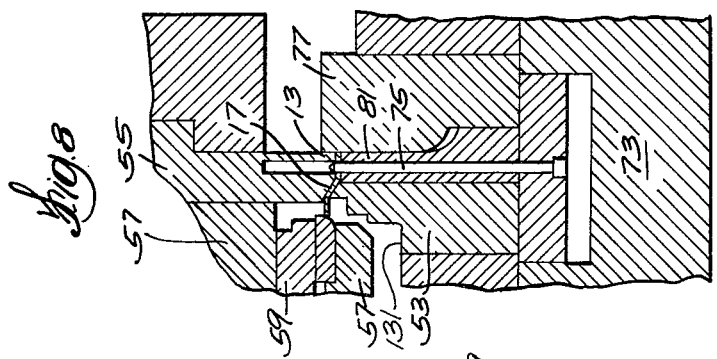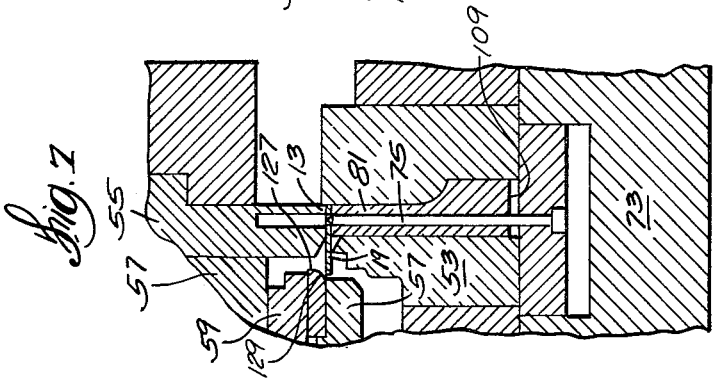

METHOD AND APPARATUS FOR FORMING A SAW CHAIN CUTTER LINK

BACKGROUND OF THE INVENTION

The invention relates to methods and apparatus for forming saw chain cutter links and particularly to saw chain cutter links 11 which include, as shown in FIG. 1, a link portion 13 which includes two space apertures 15, a shank portion 17 which extends from the link portion 13 in outward angular relation thereto, and a toe portion 19 which extends from the shank portion 17 transversely of the link portion and at approximately a right angular relation thereto. Such cutter links 11 have heretofore been formed from a generally planar blank 21 which, as shown in FIG. 2, includes the previously mentioned link portion 13, shank portion 17 and toe portion 21.

Prior apparatus for forming somewhat similar cutter links is disclosed in the U.S. Pat. No. 3,154,972 issued Nov. 3, 1964.

SUMMARY OF THE INVENTION

The invention provides both method and apparatus for forming such cutter links. In accordance with the invention, the method comprises the steps of placing the blank in a die including a stationary die part and first, second, and third movable die parts, forming the shank portion relative to the link portion into the angular relation in response to movement of the first movable die part in one direction relative to the stationary die part, partially forming the toe portion relative to the shank portion in response to movement of the second die part in the same direction as the first movable die part and relative to the stationary die part, completing forming of the toe portion into the angular relation to the shank portion and into the transverse relation to the link portion in response to movement of the third movable die part in a direction transverse to the one direction and relative to the stationary die part, and removing the formed link from the die.

In further accordance with the method of invention, the step of partially forming the toe portion includes maintaining the link portion fixed relative to the stationary die part and the step of completing forming of the toe portion includes maintaining the link portion and shank portion fixed relative to the stationary die part.

Also in accordance with the invention, the apparatus includes a stationary die part including means for locating the blank relative thereto, means including a first die part movable in a rectilinear path relative to the stationary die part for bending the shank portion relative to the link portion into the angular relation in response to movement of the first movable die part relative to the stationary die part, means including a second die part movable in the direction of the rectilinear path and relative to the stationary die part for partially bending the toe portion relative to the shank portion in response to movement of the second die part relative to the stationary die part, and means including a third die part movable in a direction transverse to the rectilinear path and relative to the stationary die part for completing bending of the toe portion into the angular relation to the shank portion and into the transverse relation to the link portion in response to movement of the third die part relative to the stationary die part.

In further accordance with the invention, the third die part is carried by the second die part, and is movable between an extended position and a retracted position relative to the second die part and is biased toward the retracted position.

Still more particularly, the stationary die part is part of a first die section and the apparatus includes a second die section which reciprocates relative to the first die section, which includes a part fixed except for such reciprocation, and which carries the first and second movable die parts. Still more specifically, the first die part is movable relative to the fixed die part of the second die section between an extended position and a retracted position, and hydraulic means is employed to urge the first die part toward the extended position, which hydraulic means comprises a cylinder including hydraulic fluid and a piston in the cylinder subject to the hydraulic fluid and connected to the first die part, and means for maintaining uniform hydraulic pressure in the fluid including means for supplying fluid to the cylinder to facilitate movement of the first die part toward the extended position and for permitting escape of fluid from the cylinder to facilitate movement of the first die part toward the retracted position.

Still more specifically, the second die part is movable relative to the fixed die part of the second die section between an extended position and a retracted position, and is urged by spring means toward the extended position. In addition, means are provided for displacing the third die part toward the extended position in response to movement of the second die section toward the first die section.

One of the principal features of the invention is the provision of a cutter link forming apparatus which is capable of substantially completely forming a saw chain cutter link from a blank during one closure of a press.

Another of the principal features of the invention is the provision of a cutter link forming apparatus which is capable of completely forming a cutter link from a blank except for sharpening of the cutting edge.

Another of the principal features of the invention is the provision of a method of economically forming a saw chain cutter link from a blank, which method can be employed during one closure of a press.

Other features and advantages of the invention will become known by reference to the following specification and claims and accompanying drawings.

DRAWINGS

FIG. 1 is a perspective view of a cutter link formed in accordance with the method and apparatus of the invention.

FIG. 2 is a view of a blank from which the cutter link of FIG. 1 is formed.

FIG. 3 is a sectional view taken along line 3—3 of FIG. 2.

FIG. 4 is a fragmentary view taken generally along line 4—4 of FIG. 6.

FIG. 5 is a fragmentary view taken generally along line 5—5 of FIG. 6.

FIG. 7 is a fragmentary view of various of the components of the apparatus shown in FIG. 6 and illustrating one step in the process of forming a cutter link in accordance with the invention.

FIG. 8 is a fragmentary view of various of the components of the apparatus shown in FIG. 6 and illustrating a further step in the process of forming a cutter link in accordance with the invention.

FIG. 9 is a fragmentary view of various of the components of the apparatus shown in FIG. 6 and illustrating a further step in the process of forming a cutter link in accordance with the invention.

FIG. 10 is a fragmentary view of various of the components of the apparatus shown in FIG. 6 and illustrating a still further step in the process of forming a cutter link in accordance with the invention.

Figure 6:
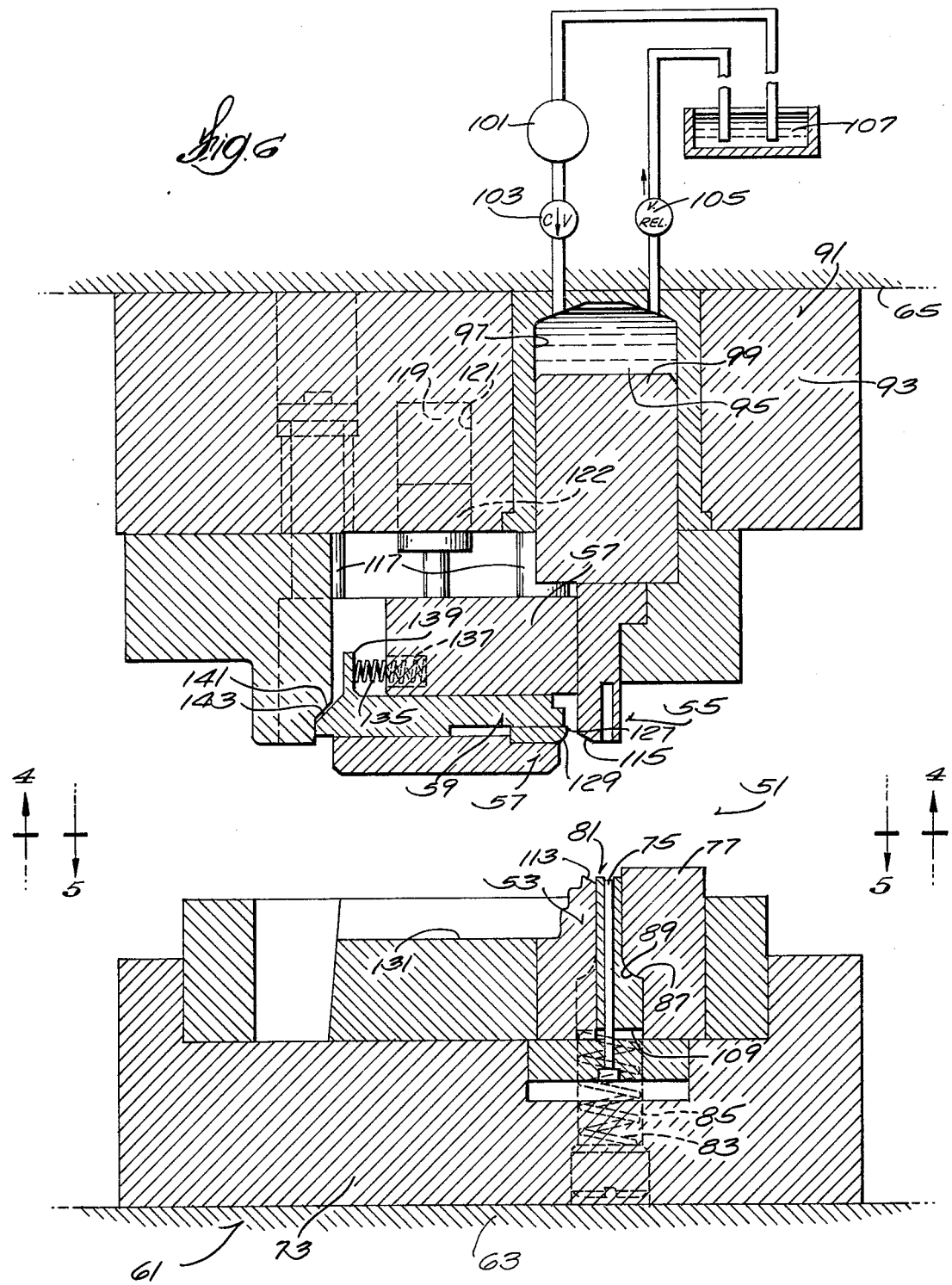
FIG. 6 is a partially schematic elevational view, partially in section, of an apparatus embodying various of the features of the invention.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also it is to be understood that the phraseology or terminology employed herein is for the purpose of description and not of limitation.

GENERAL DESCRIPTION

The method of the invention is applied by the apparatus 51 shown in FIG. 6 to the blank 21 shown in FIG. 2. Preferably, the toe portion 19 of the generally planar blank 21 is coined as shown at 25 in FIG. 2 and FIG. 3 in order to facilitate operation of the method and apparatus.

The apparatus or die 51 which performs the method of invention comprises a stationary die part 53 including means for locating the blank 21 relative thereto, means including a first movable die part movable 55 in a rectilinear path relative to the stationary die part 53 for forming or bending the shank portion 17 in angular relation to the link portion 13 in response to movement of the first die part 55 relative to the stationary die part 53, together with means including a second movable die part 57 movable in the direction of the path of the die part 55 and relative to the stationary die part 53 for partially forming or bending the toe portion 19 relative to the shank portion 17 in response to movement of the second die part 57 relative to the stationary die part 53, and means including a third movable die part 59 movable in the direction transverse to the path of the die part 53 and relative to the stationary die part 53 for completing forming or bending of the toe portion 19 into angular relation to the shank portion 17 at an angle substantially less than a right angle and into transverse relation to the link portion 13 at approximately a right angle in response to movement of the third die part 59 relative to the stationary die part 53.

More specifically, the apparatus or die 51 is carried in a fragmentarily illustrated punch press 61 having a lower fixed or stationary platen 63 and an upper movable platen 65 which reciprocates relative to the lower fixed platen 63 by a mechanism (not shown) which is well known in the art and need not be further explained. Mounted on the lower fixed platen 63 is a lower die section 73 comprising the fixed or stationary part 53 which includes means for locating the blank 21 relative to the die 51 during forming of the blank 21 into the cutter link 11. In this regard, the blank 21 is placed in the die with the coined surface 25 facing upwardly. While other arrangements could be employed, in the illustrated construction, such locating means comprises one or more stationary dowels or pins 75 (two in the illustrated construction) adapted to fit into the apertures 15 in the link portion 13 of the blank 21 together with means cooperating with the dowels 75 for retaining the blank 21 in proper position. While various means can be employed, in the illustrated construction, such means includes a fixed block 77 which engages the edge 79 of the link portion 13.

The lower die section 73 also includes a movable part or pad 81 which is reciprocal in the direction of reciprocation of the punch press 61 between an extended position and a retracted position and which extends in surrounding relation to the dowels or pins 75. The movable die part 81 is generally in the form of the link portion 13 and supports the link portion 13 in the die 51.

Means are provided for biasing the movable die part 81 outwardly of the stationary die part 53 toward the extended position and for limiting such outward movement. While other arrangements could be employed, in the illustrated construction, such means comprises one or more springs 83 located in one or more recesses 85 in the stationary die part 53 and engaging the under surface of the movable die part 81, together with cooperating surfaces 87 and 89 on the movable die part 81 and on the stationary die part 53, respectively, limiting outward movement of the movable die part 81.

Carried on the upper or movable platen 65 of the punch press 61 for reciprocation therewith is an upper die section 91 including an upper part 93 fixed relative to the movable platen 65. Also included in the upper die section 91 is the first die part 55 which is movable with the movable platen 65 and relative thereto between an extended position and a retracted position in the same direction as the direction of movement of the upper or movable platen 65.

The movable die part 55 is biased outwardly of the upper fixed die part 93 toward the lower die section 73 by suitable spring means. While various arrangements could be employed in the illustrated construction, such means comprises non-compressible hydraulic fluid 95 contained in a cylinder 97 located within the upper fixed die part 93 and including a piston 99 connected to the movable die part 55 for common reciprocation relative to the upper fixed die part 93. The cylinder 97 is connected to a schematically illustrated fluid pump 101 through a one way check valve 103 and is also connected through a pressure relief valve 105 to a sump 107 which also communicates with the pump 101.

In operation, the pump 101 supplies hydraulic fluid to the cylinder 97 and, in cooperation with the pressure relief valve 105, biases the movable part 55 outwardly toward the extended position and maintains the hydraulic fluid 95 at a predetermined pressure. As the press 61 closes, the movable part 55 engages (See FIG. 7) the link portion 13 to grip or hold the link portion 13 between the upper movable part 55 and the lower movable part or pad 81. As press closing continues, the upper movable part 55 presses the lower movable part or pad 81 into the lower stationary die part 53 against the action of the springs 83 until the base 109 of the pad or movable die part 81 engages the lower stationary die part 53 (See FIG. 8). Continued downward movement of the upper platen 65 thereafter causes retraction of the first movable die part 55 into the upper die section 91. Such retraction is accommodated by the pressure relief valve 105 which permits outflow of hydraulic fluid from the cylinder 97 while maintaining constant pressure on the movable die part 55.

During movement of the lower movable die part or pad 81 from the extended position to the retracted position, the shank portion 17 of the blank 21 is engaged between respective die surfaces 113 and 115 which are located on the lower stationary die part 53 and on the upper movable die part 55 and which, when the upper die part 55 initially engages the link portion 13, are spaced apart (See FIG. 7) and which, upon further downward movement of the upper platen 65 and during retraction of the lower movable die part or pad 81, move toward each other so as to form or bend the shank portion 17 into the desired angular relation to the link portion 13 of the blank 21 (See FIG. 8).

Such bending would normally cause the toe portion 19 to bend with the shank portion 17. However, the upper die section 91 also includes the second movable die part 57 which, during retraction of the lower pad 81 and during bending of the shank portion 17 relative to the link portion 13, wipes, bends, or forms the toe portion 19 so as to maintain the toe portion 19 in generally parallel relation to the link portion 13 (See FIG. 8).

More specifically, the second movable part 57 of the upper die section 91 is mounted on a pair of spaced dowel pins 117 for reciprocation relative to the upper fixed die part 93 in the direction of press reciprocation between an extended position and a retracted position. Means are provided for biasing or urging the second movable die part 57 toward the extended or lower position. While other means could be employed in the illustrated construction, such means comprises a fluid spring 119 comprising a cylinder 121 which includes a piston 122 movable with the second movable part 57 and which contains a compressible fluid, such as silicon, under pressure.

The second movable die part 57 includes a die surface comprising a generally vertically extending portion 127 which extends parallel to the direction of press reciprocation and a lower arcuate portion 129 extending from the bottom of the vertically extending portion 127. During retraction of the lower movable die part or pad 81 and bending of the shank portion 17, the arcuate portion 129 of the die surface engages the toe portion 19 of the blank 21 to wipe or bend the toe portion 19 into generally parallel relation to the link portion 13 as above mentioned and as shown in FIG. 8.

As the press 61 continues to close after retraction of the lower movable die part or pad 81, and as the first movable die part 55 of the upper die section 91 is retracting into the upper fixed die part 93, the second movable die part 57 continues to move with the upper fixed die part 93 toward the stationary die part 53 of the lower die section 73 and, at the same time, forms or bends the toe portion 19 downwardly into the position shown in FIG. 9 through an angle in excess of 45° so that the toe portion 19 extends at an angle of about 90° to the shank portion 17. Also, at the same time, the first movable die part 55 continues to hold the link portion 13 and the shank portion 17 fixed relative to the lower stationary die part 53 under the influence of the hydraulic pressure in the cylinder 97.

During such further bending, the second movable die part 57 enters into a socket or recess 131 in the lower stationary die part 53 and, upon completion of such bending, engages the bottom of the recess 131 prior to complete closure of the press 61 (See FIG. 9). Continued closure of the press 61 causes the second movable die part 57 to retract relative to the upper fixed die part 93 against the action of the fluid spring 119.

Means including the third movable die part 59 are also provided for completing bending of the toe portion 19 into transverse relation to the link portion 13, while retaining both the link portion 13 and the shank portion 17 fixed relative to the stationary die part 53 of the lower die section 73. While other arrangements could be employed, in the illustrated construction, the third movable die part 59 is carried on the second movable die part 57 for movement relative thereto in the direction transverse to the direction of press reciprocation between a retracted position shown in FIGS. 7, 8 and 9 and an extended toe forming position shown in the FIG. 10.

Means are provided for biasing the third movable die part 59 toward the retracted position and for displacing the third movable die part 59 to the toe forming position against the action of the biasing means in response to further closure of the press 61. More specifically, while other constructions could be employed, the biasing means comprises one or more helical compression springs 135 which are located, in part, in cylindrical recesses 137 in the second movable die part 57 and which, at one end, bear against the ends or bottoms of the recesses 137 and which, at the other end, bear against a shoulder 139 upstanding from the third movable die part 59.

The means for moving the third movable die part 59 so as to form the toe portion 19 into transverse relation to the link portion 13 comprises a camming surface 141 on the upper fixed die part 93 and a cooperating camming surface 143 on the left end of the third movable die part 59. During initial closure of the press 61, the camming surface 143 on the third movable die part 59 is located in spaced relation to the camming surface 141 on the fixed upper die part 93. However, subsequent to engagement of the second movable die part 57 with the lower stationary die part 53 and consequent to continued closure of the press 61, the camming surfaces 141 and 143 are engaged and the third movable die part 59 is displaced toward the right to complete forming of the toe portion 19 into transverse relation to the link portion 13 while the shank portion 17 and link portion 13 are retained in fixed condition between the lower and upper die sections 73 and 91.

It is noted that because of the approximately 90° angle between the shank portion 17 and the toe portion 19, as shown in FIG. 9, the force applied by the die part 59 is primarily a bending force with a relatively little if any force component acting in the plane of the toe portion 19.

It is also to be noted that forming of the cutting link 11 does not require engagement of the stationary or fixed lower and upper die parts 53 and 93 and that the link portion 13 and shank portion 17 are clamped to the lower die section 73 by the hydraulic pressure acting on the upper movable die part 55.

Upon retraction of the upper die section 91 as the press 61 opens, the lower movable die part or pad 81 moves upwardly toward its upper or extended position under the influence of the springs 83 to strip the formed cutter link 11 from the lower fixed die part 53 and locator dowels 75.

During retraction of the upper die section 91, the first movable part 55 returns to its extended position under the influence of the hydraulic pressure in the cylinder 97. In addition, the second movable die part 57 returns to its extended position under the influence of the fluid spring 119, and the third movable die part 59 returns to its retracted position under the influence of the spring 135.

The disclosed die construction can constitute one station of a progressive die and the blank 21 can be connected to a sheet or ribbon of blank material (not shown) at the forward and rearward ends 151 and 153 of the link portion 13. In such a progressive die, the connection of the blank 21 to the sheet or ribbon of blank material would be subsequently severed at a further station to separate the completed link from the ribbon.

Various of the features of the invention are set forth in the following claims.

What is claimed is:

1. Apparatus for forming a saw chain cutting link blank including a link portion, a shank portion extending from the link portion, and a toe portion extending from the shank portion, into a saw chain cutting link wherein the shank portion extends from the link portion in angular relation thereto and wherein the toe portion extends from the shank portion in angular relation thereto and in transverse relation to the link portion, said apparatus comprising a first die section including a stationary die part having means for locating the blank relative thereto, and a second die section which is reciprocable relative to said first die section and which includes a part fixed except for said reciprocation, means including a first die part movable with said fixed part relative to said stationary die part in response to fixed part reciprocation and relative to said fixed part in the direction of said reciprocation and for bending the shank portion relative to the link portion into said angular relation in response to said movement of said first movable die part relative to said stationary die part, means including a second die part movable with said fixed part relative to said stationary die part in response to fixed part reciprocation and relative to said fixed part in the direction of said reciprocation for partially bending the toe portion relative to the shank portion in response to said movement of said second die part relative to said stationary die part, means including a third die part carried by said second die part and movable in a direction transverse to said reciprocation and relative to said second die part and to said stationary die part for completing bending of the toe portion into said angular relation to the shank portion and into said transverse relation to the link portion in response to said movement of said third die part relative to said stationary die part and to said second die part, and means on said fixed part and on said third die part for transversely moving said third die part in response to relative movement between said fixed part and said second die part.

2. Apparatus in accordance with claim 1 wherein said third die part is movable between an extended position and a retracted position relative to said second die part, and means for biasing said third movable die part toward said retracted position.

3. Apparatus in accordance with claim 1 wherein said first die part is movable relative to said fixed die part of said second die section between an extended position and a retracted position, and hydraulic means urging said first die part toward said extended position, said hydraulic means comprising a cylinder including hydraulic fluid and a piston in said cylinder subject to said hydraulic fluid and connected to said first die part, and means for maintaining uniform hydraulic pressure in said fluid including means for supplying fluid to said cylinder to facilitate movement of said first die part toward said extended position and means for permitting escape of fluid from said cylinder to facilitate movement of said first die part toward said retracted position.

4. Apparatus in accordance with claim 1 wherein said second die part is movable relative to said fixed die part of said second die section between an extended position and retracted position, and spring means urging said second die part toward said extended position.

5. Apparatus in accordance with claim 1 wherein said third die part is movable relative to said second die part between an extended position and a retracted position, means biasing said third die part toward said retracted position, and wherein said third die part is displaced toward said extended position in response to movement of said second die section toward said first die section.

6. Apparatus in accordance with claim 1 wherein said first die section includes a movable die part aligned with said first die part of said second die section and movable relative to said stationary die part of said first die section between an extended position and a retracted position, and means biasing said movable die part of said first die section toward said extended position, said movable die part of said first die section being displaced toward said retracted position in response to engagement of the blank by said first die part of said second die section.

7. A method of forming a generally planar saw chain cutting link blank including a link portion, a shank portion extending from the link portion, and a toe portion extending from the shank portion into a saw chain cutting link wherein the shank portion extends from the link portion in angular relation thereto and wherein the toe portion extends from the shank portion in angular relation thereto and in transverse relation to the link portion, said method comprising the steps of placing the blank in a die including a first section having a stationary die part and a second section which is reciprocable relative to the first section and which includes a fixed part and first, second, and third die parts movable with the fixed part and relative to the fixed part, forming the shank portion relative to the link portion into said angular relation in response to movement of the first movable die part in one direction relative to the stationary die part, partially forming the toe portion relative to the shank portion in response to movement of the second die part in the same direction as the first movable die part and relative to the stationary die part, completing forming of the toe portion into the angular relation to the shank portion and into the transverse relation to the link portion in response to movement of the third movable die part in a direction transverse to the one direction and relative to the stationary die part in response to movement of the second die part relative to the fixed part, and removing the formed link from the die.

8. A method in accordance with claim 7 wherein the step of partially forming the toe portion includes maintaining the link portion fixed relative to the stationary die part.

9. A method in accordance with claim 7 wherein the step of completely forming of the toe portion includes maintaining the link portion and shank portion fixed relative to the stationary die part.

10. Apparatus for forming a saw chain cutting link blank including a link portion, a shank portion extending from the link portion, and a toe portion extending from the shank portion, into a saw chain cutting link wherein the toe portion extends from the shank portion in angular relation thereto and in transverse relation to the link portion, said apparatus comprising a first die section including a stationary die part having means for locating the blank relative thereto, and a second die section which is reciprocable relative to said first die section and which includes a part fixed except for said reciprocation, means including a first die part movable with said fixed part relative to said stationary die part in response to fixed part reciprocation and relative to said fixed part in the direction of said reciprocation for partially bending the toe portion relative to the shank portion in response to said movement of said first die part relative to said stationary die part, means including a second die part carried by said first die part and movable in a direction transverse to said reciprocation and relative to said first die part and to said stationary die part for completing bending of the toe portion into said angular relation to the shank portion and into said transverse relation to the link portion in response to said movement of said second die part relative to said stationary die part and to said first die part, and means on said fixed part and on said second die part for transversely moving said second die part in response to relative movement between said fixed part and said first die part.

11. A method of forming a saw chain cutting link blank including a link portion, a shank portion extending from the link portion, and a toe portion extending from the shank portion into a saw chain cutting link wherein the toe portion extends from the shank portion in angular relation thereto and in transverse relation to the link portion, said method comprising the steps of placing the blank in a die including a first section having a stationary die part and a second section which is reciprocable relative to the first section and which includes a fixed part and first and second die parts movable with the fixed part and relative to the fixed part, partially forming the toe portion relative to the shank portion in response to movement of the first die part in one direction relative to the stationary die part, completing forming of the toe portion into the angular relation to the shank portion and into the transverse relation to the link portion in response to movement of the second movable die part in a direction transverse to the one direction and relative to the stationary die part in response to movement of the first die part relative to the fixed part, and removing the formed link from the die.

* * * * *